United States Patent [19]
Pighin et al.

[11] 3,868,534
[45] Feb. 25, 1975

[54] ELECTROCHEMILUMINESCENT DEVICE HAVING A MIXED SOLVENT

[75] Inventors: Albert Pighin, Ottawa; Robert Alvin Creswell, Carp; Douglas Peter Malanka, Ottawa, Ontario, all of Canada

[73] Assignee: Bell Canada-Northern Electric Research Limited, Ottawa, Ontario, Canada

[22] Filed: Nov. 29, 1972

[21] Appl. No.: 310,247

[52] U.S. Cl. ................................ 313/483, 313/358
[51] Int. Cl. ............................................ H05b 33/02
[58] Field of Search ............ 313/108 R, 109.5, 358, 313/483; 252/188.3 CL

[56] References Cited
UNITED STATES PATENTS

| | | | |
|---|---|---|---|
| 3,213,440 | 10/1965 | Gesteland et al. | 313/358 X |
| 3,329,621 | 7/1967 | Rauhut et al. | 252/188.3 CL |
| 3,391,068 | 7/1968 | Rauhut | 313/108 R |
| 3,654,525 | 4/1972 | Maricle et al. | 313/358 X |

*Primary Examiner*—Palmer C. Demeo
*Attorney, Agent, or Firm*—Sidney T. Jelly

[57] ABSTRACT

The use of a solvent comprising a mixture of an aprotic solvent and an aromatic solvent in an electrochemical-luminescent device results in an increased luminance, an increased concentration of the fluorescent compound, and an increased efficiency.

7 Claims, 2 Drawing Figures

3,868,534

ELECTROCHEMILUMINESCENT DEVICE HAVING A MIXED SOLVENT

This invention relates to electrochemical luminescent devices, and in particularly to such devices having a luminance of an intensity which is useful, such that they can be used for various display applications.

Electrochemical luminescence, hereinafter referred to as ECL for brevity, is a means for converting electrical energy into light, at low voltages. While ECL has been known for some time, instability-resulting in a very short useful life- and low luminance have restricted its application, it being mainly of laboratory interest.

There are certain factors which affect the acceptability of an ECL cell as a light source. One of these is stability -that is the useful life of the cell- and another is luminance.

The present invention is concerned particularly with the increase in luminance of devices. ECL is produced at one or more electrodes in a solution having three components: a solvent, an electrolyte, and a fluorescor. The electrolyte makes the solvent conducting, and the fluroescor is the active member in the emission of light. There is a balance between the three components and hitherto this has resulted in low levels of luminance.

By making the solvent of a mixed form, the efficiency and luminance of an ECL cell can be increased.

Other advantages also occur as will be apparent from the following description of various embodiments, by way of example, in conjunction with the accompanying diagrammatic drawings in which.

Figure 1:
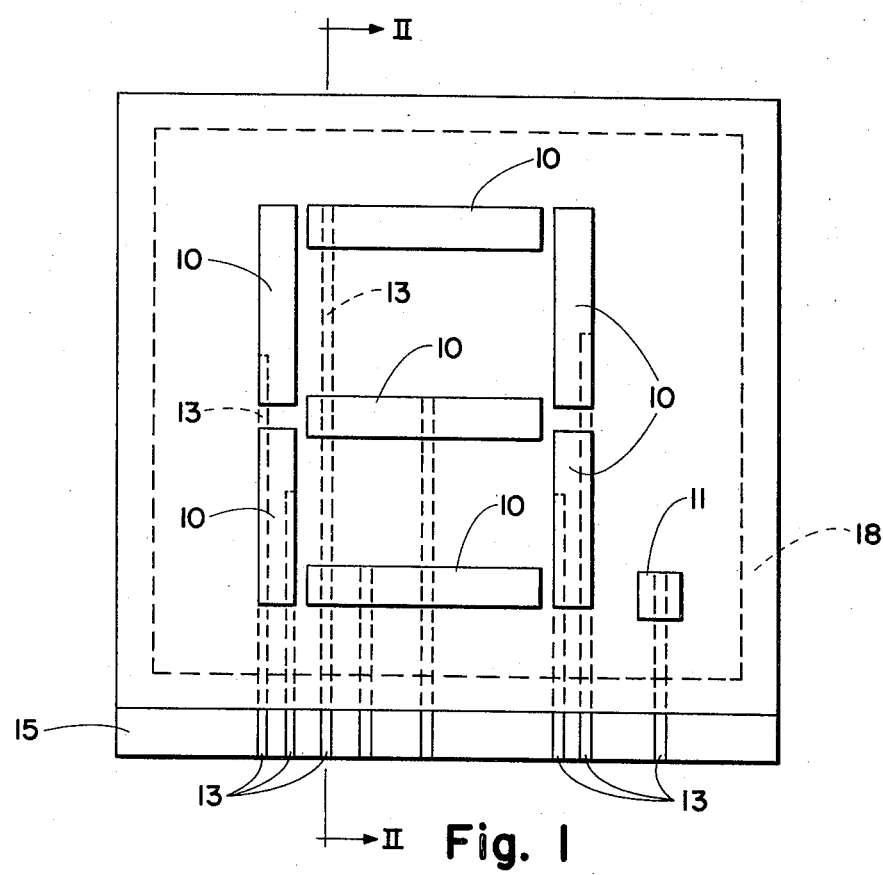
FIG. 1 is a plan view of a display device, as an example only.

As previously stated, ECL is a means for converting low voltage electrical energy into light. It has not yet found commercial use, as only short useful lives and low luminance have hitherto been possible. By overcoming these disadvantages ECL cells have commercial interest and use can be made.

ECL is produced from a solution having three components: a solvent; and electrolyte and a fluorescor. Useful life, that is stability, can be obtained by processing normally used raw materials to give materials of high purity. This is a novel feature, not hitherto known or appreciated, and is the subject of copending application Ser. No. 310,249 filed in the name of the present assignees on Nov. 29, 1972.

Considerable difficulty has been found in attempting to increase the luminance of ECL cells. While cells have been produced which could be seen in a dark or dimly lit room, it is necessary for commercial use that cells should be visible in normally lit rooms, and in daylight. Many efforts to improve luminance have not obtained effective results. Some increase has been obtained by increasing the driving voltage but there is a limit to any such increase due to break-down of the solution. Also the practical efficiency, expressed as photons of light out per electron of power supplied is extremely low.

As stated, the solution has three components, solvent, electrolyte and fluorescor. Solvents used can be referred to as aprotic solvents, that is solvents which do not produce protons. Protons would eventually destroy the effectiveness of the solution. Typical families of solvents are: amides, nitriles, ethers, sulfoxides, carbonates, amines. Typical electrolytes are alkyl perchlorates; alkyl haloborates; and alkyl sulfonates. For fluorescors, substituted polyacenes, metal chelates and porphyrins can be used. Additives for using with the solvent to form the mixed solvent are; aromatic solvents such as benzene, toluene, and xylene. Three solvents known and used are acetonitrile (ACN); benzonitrile (PhCN); and N,N'-dimethylformamide (DMF). A typical electrolyte, for example, is tetra-n-butylammonium perchlorate (TBAP). A suitable fluorescor is rubrene -a polysubstituted polyacene. The solvent is to dissolve the fluorescor and the electrolyte is to make the solvent electrically conducting. In use, in one particular form of cell, normally one electrode is formed on one plate of the cell and a further electrode is formed on another plate, the two plates spaced a small distance apart, parallel to each other. The space between the plates is filled with the solution of solvent, electrolyte and fluorescor. Electrical energy is applied to the electrodes and the fluorescor emits light. One electrode is transparent for the emission of light therethrough. In an alternative form, both electrodes are formed on the same plate.

The present invention uses a mixed solvent. By this means several advantages occur, including: greater luminance, better contrast ratio; higher efficiency, lower dielectric constant, maintenance of a large liquid temperature range, and maintenance of sufficient conductivity to operate at low voltages.

It should be appreciated that many requirements of an ECL cell can be mutually opposed. Increasing the amount of electrolyte in the solution increases the conductivity but reduces luminance. Other variations can also produce both good and bad results. For these reasons it is difficult to apply logical reasoning to the problems.

In the application of the present invention, as an example, using one of three known solvents, that is ACN, PhCN, and DMF, addition of an aromatic solvent such as benzene ($C_6H_6$) or toluene ($C_6H_5CH_3$) or xylene ($C_6H_4(CH_3)_2$) allows increased concentration of fluorescor without increasing the driving voltage unduly. A further additive is 1-methyl-2-pyrrolidinone (MP).

A particular example of a useful solution is one composed of DMF as the basic solvent, with the addition of benzene in a 1:1 ratio; TBAP as the electrolyte and rubrene as the fluorescor. The proportions of electrolyte and fluorescor in the solution are:- electrolyte 10–100 millimolar, fluorescor 10 millimolar.

As an example of the possible increase in concentration of fluorescor, with DMF as a solvent less than 2 millimolar of rubrene could be dissolved. With the addition of benzene up to 17 millimolar has been dissolved, and this can be further increased. The additive must not interfere with the electrolyte solubility and should increase fluorescor solubility. In addition to the increase in luminance there is an increase in efficiency in that more photons are emitted per electron. In a cell with the above described solution, electrodes of gold, platinum or doped tin oxide can be used. The use of a platinum electrode has an advantage in that in the event of a localized breakdown, the electrode is not permanently damaged and can be restored merely by switching off the device for a very short term.

A cell with mixed solvents, as described, operates most efficiently with an AC stimulus. While DC drive is theoretically possible with extreme small clearances between electrodes, commercially acceptable clearances appear to require the AC drive. A square wave form is preferable.

Figure 2:
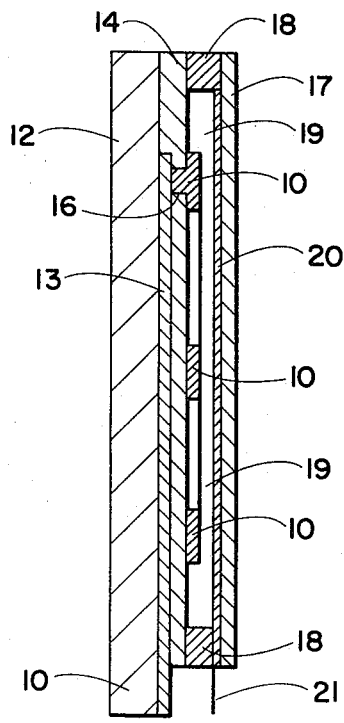
FIG. 2 is a cross-section on the line II—II of FIG. 1.

FIGS. 1 and 2 illustrate, in a very diagrammatic form, one type of ECL cell. In particular, the cell is drawn to an enlarged size in order to show details clearly. The cell in the drawings is for a numerical display array, the arry formed by seven segments 10 in the usual manner. By energizing selected segments any numeral desired can be caused to be visible. A further segment 11 can be provided for a decimal point. The array is built up on a ceramic support plate or substrate 12. The electrical conductor leads 13 for the segments 10 and 11 are deposited or formed on the substrate 12 and a layer of dielectric 14 then applied over the substrate, leaving uncovered only the edge 15 of the substrate at which the leads 13 emerge. Holes 16 are formed through the dielectric layer 14 at positions relating to the corresponding segment positions and then electrode material, for example platinum, is deposited to form the array segments 10 and 11. The electrode material contacts with the leads 13 via the holes 16. A cover 17 of glass is then positioned over the array, spaced by a thin spacer 18, for example of polyethylene. The glass cover 17, spacer 18 and dielectric covered substrate 12 are bonded together to form a closed container. The space 19 is filled with a solution, for example as detailed above, that is a 1:1 mixed solvent of DMF and Benzene, TBAP as electrolyte and rubrene as fluorescor. The glass cover has a transparent electrode 20 applied to its inner surface and an electrical lead 21 is connected to this electrode. The electrode 20 is of tin oxide for example and is shown much exaggerated in thickness in FIG. 2.

As already stated, in an alternative form of cell, not illustrated, both electrodes can be formed on the same support plate. In an array as in FIG. 1, for example, it is possible to form the counter-electrode, the electrode 20 in FIG. 2, on the substrate 12. This electrode would be, for example, in the spaces bounded by the segments 10, with small isolating gaps between the segments and counter-electrode.

The array illustrated in the drawings is only one example of an ECL cell. Such cells can be very large and have a very complex array or pattern of display matter. The materials of a cell are relatively cheap and large units can economically be made. In addition to small units such as can be used for displaying information and the like for calculators and other similar apparatus, large units can be made for the display of, for example, advertising matter, progression flow charts in processing plants and other material.

A typical driving voltage for a device as in FIGS. 1 and 2, is 4 volts peak to peak. For a device as illustrated, having a size approximately one-third inch square, the current is approximately 7 milliamperes.

The two important features arising from the invention are the increased luminance and the increased efficiency. These two features are not necessarily predictable one because of the other. It is also unexpected in that these improvements to the two particular features are obtained without detrimental effect on other features, such as dielectric constant, viscosity, temperature range and electrolyte conductivity.

What is claimed is:

1. An electrochemical luminescent device comprising:
a support plate; an electrode array on said support plate, said array comprising at least one electrode; electrical conductor means connected to said electrode array; a transparent cover plate spaced from said support plate and electrode array; a spacing member extending between said support plate and said cover plate to define a sealed space between said electrode array and said cover plate; a counter electrode in said sealed space; electrical conductor means connected to said counter electrode; and an electrochemical luminescent solution in said sealed space, said luminescent solution comprising a mixture of a fluorescent compound, a solvent for the fluorescent compound, and an electrolyte, the solvent being a mixture of an aprotic solvent and an aromatic solvent.

2. A device as claimed in claim 1, the aprotic solvent being one selected from amides, nitriles, ethers, sulfoxides, carbonates and amines.

3. A device as claimed in claim 1, the aprotic solvent being one selected from acetonitrile, benzonitrile, and N,N'-dimethylformamide.

4. A device as claimed in claim 1, the aromatic solvent being one selected from benzene, toluene, and xylene.

5. A device as claimed in claim 1, the fluorescent compound selected from substituted metal chelates and porphyrins.

6. A device as claimed in claim 1, the fluorescent compound composed of rubrene.

7. A device as claimed in claim 1, the fluorescent compound composed of rubrene; the solvent a mixture of N,N'-dimethylformamide and benzene in a 1:1 ratio; and the electrolyte of tetra-n-butylammonium perchlorate, the proportions of electrolyte and fluorescent compound in the range: electrolyte 10 to 100 millimolar and fluorescent compound 10 millimolar.

* * * * *